United States Patent [19]

Titti et al.

[11] Patent Number: 4,918,113

[45] Date of Patent: Apr. 17, 1990

[54] PRODUCTION OF PLASTIC FOAM MATERIAL

[75] Inventors: Otello U. Titti; Patrick P. Cesta, both of Mississauga; Alan G. Wheeler, Oakville; John C. Collins, Burlington, all of Canada

[73] Assignee: Valvoline Oil & Chemicals Ltd., Mississauga, Canada

[21] Appl. No.: 212,646

[22] Filed: Jun. 28, 1988

[51] Int. Cl.$^4$ ............................................. C08L 67/00
[52] U.S. Cl. ..................................... 521/138; 521/92; 521/124; 521/125; 525/48
[58] Field of Search ........................... 525/48; 521/138

[56] References Cited

U.S. PATENT DOCUMENTS 3,232,893  2/1966  Salgado et al. ..................... 525/48

Primary Examiner—Morton Foelak
Attorney, Agent, or Firm—Arne I. Fors

[57] ABSTRACT

A process for producing an unsaturated resin solution suitable for reaction with a catalyst, water, and a gas releasing salt and a gas-release control agent to produce plastic foam material includes providing an initial unsaturated resin solution with a predetermined relatively low acid value, and mixing the initial unsaturated resin solution with a half-ester to raise the acid value to a predetermined higher value.

10 Claims, No Drawings

PRODUCTION OF PLASTIC FOAM MATERIAL

This invention relates to the production of plastic foam material.

Plastic foams are conventionally manufactured by forming a liquid mixture by mixing an unsaturated resin, a catalyst operable to cause curing of the unsaturated resin, a promoter operable to activate the catalyst, a gas-releasing salt and an acid operable to cause the release of gas from the salt. The liquid mixture foams and cures by gelling and subsequent hardening.

Post-gelation gasing has been a problem in such processes. U.S. Pat. No. 4,689,352 (Titti et al.), issued Aug. 25, 1987, teaches that the harmful effect of post-gellation gasing is reduced if a volatile liquid gas-release control agent is included in the mixture. The gas-release control agent volatilizes during curing and maintains gas-release passages open in the foam to thereby permit release of gas from the foam during hardening and after gellation, i.e. during cross-linking, at least until the foam is structurally stable. The contents of U.S. Pat. No. 4,689,352 are hereby incorporated herein by reference.

Titti et al. teach the carrying out of the invention by mixing two liquid components. The first component typically contains resin, promoter, gas-releasing salt, gas-release control agent and filler (if necessary), and the second component typically contains resin, acid, water and a catalyst. In commercial practice, a manufacturer supplies a customer with Component A and Component B, with component A containing a resin, promoter and gas-release control agent, and Component B containing a resin, acid and water, i.e. constituents which are not readily commercially available to a customer and/or which require special processing. The customer adds further necessary constituents, which are readily commercially available and are easy to add to Component A and Component B. For example, the customer may add a gas-releasing salt and filler to Component A, and may add a catalyst to Component B. Further constituents, such as a thixotropic agent, surfactant or monomer, may also be added by the customer as required.

In practice, Component B is awkward to produce because the resin (which acts as a carrier for other constituents) usually does not readily mix with the acid, which typically may be citric acid. Also, Component B is usually not sufficiently stable after the addition of the catalyst for pratical purposes, since it is likely to deteriorate if left for a relatively lengthy period of time before use, for example over a weekend. Further, a customer would in fact prefer to have to purchase only one component from a manufacturer, not two components.

It is therefore an object of the invention to provide an improved process for the production of plastic foam material which utilizes a gas-release control agent and which enables a manufacturer to supply a customer with a single component to which the customer can add other constituents that are readily commercially available.

The present invention is based on the discovery that a suitable single component can be produced by utilizing an unsaturated resin solution comprising an initial unsaturated resin solution mixed with a half-ester, the half-ester being the result of a reaction between a first compound selected from the group consisting of alcohols and glycols and a second compound selected from group consisting of organic dibasic acids and anhydrides, where only one replaceable hydrogen site of the second compound is reacted with the first compound, the other site being unreacted.

It is known to produce an unsaturated resin by reacting an appropriate glycol with an appropriate acid or anhydride until the resultant resin has a predetermined acid value, typically about 20 or 30. The resin is then dissolved in a suitable reactive solvent, such as styrene monomer, to produce an unsaturated resin solution which is liquid at room temperature.

In accordance with the invention, after dissolution in the reactive solvent, the unsaturated resin solution is mixed with a half-ester in an amount sufficient to raise the acid value to a predetermined higher value, typically in the range from about 40 to about 100, and more typically about 60. The amount of half-ester may typically be up to about 10% by weight of the initial unsaturated resin solution.

It was found that merely stopping a prior art glycol/acid or anhydride reaction at a higher acid value does not produce the advantages of the present invention in which the higher acid value is obtained with a half-ester.

The resultant unsaturated resin solution (possibly with the addition of a promoter) can then be sold to a customer, who can then add a gas-releasing salt and filler (if necessary) to produce a resin system, as well as a gas-release control agent in accordance with U.S. Pat. No. 4,689,352.

The resin system, with a thixotropic agent if necessary, can be dispensed with relatively simple equipment which also injects the catalyst and water into the resin system as it is dispensed. Advantageously, both the catalyst and the water are provided by adding a water-containing benzoyl peroxide solution.

The half-ester is preferably capable of becoming cross-linked with the resin and may, for example, be a half-ester of an alcohol or a glycol reacted with an acid or anhydride. The half-ester may, for example be the maleate half-ester of methanol or propylene glycol produced by the reaction of maleic anhydride with methanol or propylene glycol.

In one embodiment of the invention, an unsaturated polyester resin, is produced by reacting one or more glycols with maleic or pthallic anhydride for a period of time until the acid value of the resultant resin has fallen to about 20. This exothermic reaction may be carried out in any conventional resin-forming reactor. The resultant hot liquid resin is then poured into a blend tank where the resin is then dissolved in a reactive solvent, such as styrene monomer, to produce an unsaturated polyester initial resin solution which is liquid at room temperature, a typical proportion being 60% resin and 40% styrene by weight.

A half-ester formed by a reaction of maleic anhydride and methanol, which is liquid at room temperature, and having an acid value of about 400, is then mixed with the initial resin solution in an amount sufficient to raise the acid value of the resin solution to about 60, a typical proportion being about 5% half-ester with 95% inital resin solution by weight. A promoter is then added, for example dimethyl aniline or dimethyl toluidine.

The resultant solution is stable and suitable for sale to a customer. Before use, the customer adds a gas-releasing salt, typically a carbonate or bi-carbonate, for example sodium bi-carbonate, a filler, such as aluminium tri-hydrate (which also acts as a fire retardant), and a gas-release control agent, such as methanol.

The resultant unsaturated resin solution is also stable and can be left "on the shelf" for a reasonable time, for example over a weekend, without any significant deterioration occurring. The gas releasing salt is slow to act with the acid radicals because no water is present.

To produce plastic foam material, it is simply necessary for a customer to mix the resin solution with water-containing catalyst. The resin solution can be dispensed with relatively simple equipment, which also satisfactorily mixes the resin solution with the water-containing catalyst, preferably by external impingement of the catalyst and resin solution under relatively low pressure. Such external impingement eliminates the possibility of premature gellation of the components and also means that no extensive cleaning of the equipment is necessary during shutdown.

Advantageously, benzoyl peroxide solution is used to supply both catalyst and water, a suitable benzoyl peroxide solution being that sold under the trademark "Abcure 20-50" by Abco Industries of Queenville, S.C., and containing 10-40% active ingredient and 20-80% water (non-active ingredients, such as, surfactants are also included).

Specific composition of such a final resin solution may be, for example (in weight percent), as follows:

| | |
|---|---|
| AROPOL C100 (Resin) | 44.73 |
| AROPOL Q6948 (Acid Source from half-ester) | 2.7 |
| FUMED SILICA (Thixotropic agent) | 0.4 |
| DIMETHYLANILINE (Promoter) | 0.08 |
| DIMETHYL P-TOLUIDINE (Promoter) | 0.08 |
| METHANOL | 0.01 |
| STYRENE | 6.4 |
| ALUMINA TRI-HYDRATE | 42.9 |
| SODIUM BICARBONATE | 2.7 |

A typical amount of Abcure A 20-50 catalyst would be 2-5% by volume of the above resin solution, with the resultant filled polyester foam having a density in the range of 40-65 lbs./ft.$^3$.

Such a foam is a general polyester structural foam, with one use, for example, being to reinforce a shaped article, such as an acrylic bath tub.

Other advantages of the invention will be readily apparent to a person skilled in the art. For example, there is no longer any need for dispensing equipment with an internal high pressure mixing capability as was the case with the prior art two-component system. Also, the foamed plastic product can be filled or unfilled and may have corrosion resistant or fire resistant constituents.

The scope of the invention is defined in the appended claims.

We claim:

1. A process for producing an unsaturated polyester resin solution suitable for reaction with a catalyst, water, a gas releasing salt and a gas-release control agent to produce plastic foam material, the process comprising providing an initial unsaturated polyester resin solution with a predetermined relatively low acid value, and mixing said initial unsaturated resin solution with a half-ester to raise the acid value to a predetermined high value, said half-ester being the result of a reaction between a first compound selected from the group consisting of alcohols and glycols and a second compound selected from the group consisting of organic dibasic acids and anhydrides where only one replaceable hydrogen site of the second compound is reacted with the first compound, the other site being unreacted.

2. A process according to claim 1 wherein the initial unsaturated resin solution is mixed with the half-ester to raise the acid value to a value in the range of from about 40 to about 100.

3. A process according to claim 2 wherein the initial unsaturated resin solution is mixed with a half-ester to raise the acid value to about 60.

4. A process according to claim 1 wherein the half-ester acid is a half-ester produced by reaction between methanol and maleic anhydride.

5. A process according to claim 1 wherein the half-ester is a half-ester produced by reaction between propylene glycol and maleic anhydride.

6. An unsaturated polyester resin solution suitable for reaction with a catalyst, water, a gas releasing salt and a gas-release control agent to produce plastic foam material, said unsaturated resin solution comprising an initial unsaturated polyester resin solution mixed with a half-ester, said half-ester being the result of a reaction between a first compound selected from the group consisting of alcohols and glycols and a second compound selected from the group consisting of organic dibasic acids and anhydrides where only one replaceable hydrogen site of the second compound is reacted with the first compound, the other site being unreacted.

7. An unsaturated resin solution according to claim 6 wherein the solution has an acid value in the range from about 40 to about 100.

8. An unsaturated resin solution according to claim 7 whrein the solution has an acid value of about 60.

9. An unsaturated resin solution according to claim 6 wherein the half-ester is a half-ester produced by reaction between methanol and maleic anhydride.

10. An unsaturated resin solution according to claim 6 wherein the half-ester is a half-ester produced by reaction between propylene glycol and maleic anhydride.

* * * * *